US012650722B2

(12) United States Patent (10) Patent No.: US 12,650,722 B2
Yoon et al. (45) Date of Patent: Jun. 9, 2026

(54) ELECTRONIC DEVICE OPERATING EXTERNAL DEVICE IN LOW-POWER MODE USING PATTERN INFORMATION AND CONTROL METHOD THEREOF

(71) Applicant: Samsung Electronics Co., Ltd., Suwon-si (KR)

(72) Inventors: Sukun Yoon, Suwon-si (KR); Junghee Kim, Suwon-si (KR); Jaehwan Sim, Suwon-si (KR); Jeongrok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 18/782,678

(22) Filed: Jul. 24, 2024

(65) Prior Publication Data

US 2025/0117062 A1 Apr. 10, 2025

Related U.S. Application Data

(63) Continuation of application No. PCT/KR2024/008764, filed on Jun. 25, 2024.

(30) Foreign Application Priority Data

Oct. 6, 2023 (KR) ........................ 10-2023-0133709

(51) Int. Cl.
*G06F 1/26* (2006.01)
*G06F 1/3231* (2019.01)
*G06F 1/3203* (2019.01)

(52) U.S. Cl.
CPC .......... *G06F 1/3231* (2013.01); *G06F 1/3203* (2013.01)

(58) Field of Classification Search
CPC ..................................................... G06F 1/3231
(Continued)

(56) References Cited

U.S. PATENT DOCUMENTS 8,601,301 B1 * 12/2013 Arscott ................ G06F 1/3231
713/320
9,978,018 B2 * 5/2018 Johnson .................. H04W 4/38
(Continued)

FOREIGN PATENT DOCUMENTS

CN 108427758 8/2018
JP 2014020790 A 2/2014
(Continued)

OTHER PUBLICATIONS

Search Report and Written Opinion dated Oct. 15, 2024 issued in International Patent Application No. PCT/KR2024/008764.

*Primary Examiner* — Volvick Derose
(74) *Attorney, Agent, or Firm* — Nixon & Vanderhye, P.C.

(57) ABSTRACT

An electronic device is disclosed. The electronic device includes a communication interface, comprising communication circuitry, a memory storing use pattern information corresponding to a plurality of users, respectively, and at least one processor, comprising processing circuitry, wherein at least one processor, individually and/or collectively, is configured to: identify whether the respective users are absent within a specified area based on a specified condition, and control the communication interface to transmit a control command operating a first external device from among a plurality of external devices in a low-power mode to the first external device based on first use pattern information corresponding to a first user identified as absent within the specified area from among the plurality of users.

20 Claims, 11 Drawing Sheets

100

(58) Field of Classification Search
USPC ........................................................ 713/320
See application file for complete search history.

(56) References Cited

U.S. PATENT DOCUMENTS

| | | | |
|---|---|---|---|
| 10,966,149 B2 | 3/2021 | Yoon et al. | |
| 11,036,451 B2 | 6/2021 | Yoon et al. | |
| 11,398,963 B2 | 7/2022 | Kim et al. | |
| 11,412,577 B2 | 8/2022 | Kim et al. | |
| 11,720,134 B2* | 8/2023 | Kopp | G06N 7/01 |
| | | | 702/179 |
| 2001/0052862 A1* | 12/2001 | Roelofs | H04N 21/234 |
| | | | 340/999 |
| 2005/0064916 A1* | 3/2005 | Ozluturk | H04M 1/72448 |
| | | | 455/575.1 |
| 2012/0053740 A1* | 3/2012 | Venkatakrishnan | G06Q 50/06 |
| | | | 700/291 |
| 2012/0164976 A1* | 6/2012 | Ando | H04L 12/2834 |
| | | | 455/410 |
| 2015/0017965 A1* | 1/2015 | Lim | H04W 52/0258 |
| | | | 455/418 |
| 2016/0291671 A1* | 10/2016 | Rider | H02J 13/00002 |
| 2018/0048484 A1* | 2/2018 | Gelonese | H04L 12/283 |
| 2019/0272459 A1* | 9/2019 | Kim | G06F 3/167 |
| 2020/0211358 A1* | 7/2020 | Burke | G08B 21/043 |
| 2020/0266649 A1* | 8/2020 | Lee | H04W 52/027 |
| 2021/0302479 A1* | 9/2021 | Schacht | G01D 4/004 |
| 2021/0377601 A1* | 12/2021 | Patil | G06F 1/3228 |
| 2022/0353599 A1* | 11/2022 | Chen | H04R 1/1016 |

FOREIGN PATENT DOCUMENTS

| | | | |
|---|---|---|---|
| KR | 20120002310 A | 1/2012 | |
| KR | 101543651 B1 | 8/2015 | |
| KR | 10-1745825 | 6/2017 | |
| KR | 10-2017-0085818 | 7/2017 | |
| KR | 10-1807738 | 1/2018 | |
| KR | 10-2018-0037740 | 4/2018 | |
| KR | 10-2019-0133828 | 12/2019 | |
| KR | 10-2133571 | 6/2020 | |
| KR | 20200079602 A | 7/2020 | |
| KR | 10-2021-0020283 | 2/2021 | |

* cited by examiner

| COMMUNICATION INTERFACE | ⟷ | AT LEAST ONE PROCESSOR | ⟷ | MEMORY |

< User 1 >

| REFRIGERATOR | ~ |
|---|---|
| WASHER | 10:00 ~ 12:00 |
| TV | 20:00 ~ 21:00 |

< User 2 >

| NOTEBOOK | 20:00 ~ 22:30 |
|---|---|
| STAND LIGHT | 22:00 ~ 24:00 |
| TV | 19:00 ~ 20:00 |

ELECTRONIC DEVICE OPERATING EXTERNAL DEVICE IN LOW-POWER MODE USING PATTERN INFORMATION AND CONTROL METHOD THEREOF

CROSS-REFERENCE TO RELATED APPLICATIONS

This application is a continuation of International Application No. PCT/KR2024/008764 designating the United States, filed on Jun. 25, 2024, in the Korean Intellectual Property Receiving Office and claiming priority to Korean Patent Application No. 10-2023-0133709, filed on Oct. 6, 2023, in the Korean Intellectual Property Office, the disclosures of each of which are incorporated by reference herein in their entireties.

BACKGROUND

1. Field

The disclosure relates to an electronic device and a control method thereof, and for example, to an electronic device that operates in a low-power mode using use pattern information and a control method thereof.

2. Description of Related Art

Recently, home appliances for various purposes are being developed, and a number of home appliances provided within a home is increasing. As home appliances increase within the home, there is an increase in demand for a method to efficiently manage a total power consumption.

Although there have been various methods for managing power consumption in the related art, there has been an inconvenience of a user having to manually activate a mode for reducing power consumption, or having to input a command for activating a low-power mode to each of the home appliances.

A power consumption managing method which activates the low-power mode when a specific condition is satisfied (e.g., for a specific time) has had a problem of the low-power mode being activated taking into consideration only the satisfaction of the specific condition even while a user is using the home appliance.

Accordingly, to efficiently manage the total power consumption within a household, there has been a demand for selectively activating the low-power mode from among a plurality of home appliance provided within the home taking into consideration a pattern in which the user uses the home appliances.

SUMMARY

According to an example embodiment of the disclosure, an electronic device includes: a communication interface comprising communication circuitry, a memory storing use pattern information corresponding to a plurality of users, respectively, and at least one processor, comprising processing circuitry, wherein at least one processor, individually and/or collectively, is configured to: identify whether the respective users are absent within a specified area based on a specified condition, and control the communication interface to transmit a control command operating a first external device from among a plurality of external devices in a low-power mode to the first external device based on first use pattern information corresponding to a first user identified as being absent within the specified area from among the plurality of users.

According to an example embodiment of the disclosure, a method of controlling an electronic device includes: identifying whether a plurality of users are respectively absent within a specified area based on a specified condition, and transmitting a control command operating a first external device from among a plurality of external devices in a low-power mode to the first external device based on first use pattern information corresponding to a first user identified as being absent within the specified area from among the plurality of users.

According to an example embodiment of the disclosure, a non-transitory computer-readable recording medium having recorded thereon a program which when executed by at least one processor of an electronic device, causes the electronic device to perform a method of controlling the electronic device, the method comprising: identifying whether a plurality of users are respectively absent within a specified area based on a specified condition, and transmitting a control command operating a first external device from among a plurality of external devices in a low-power mode to the first external device based on first use pattern information corresponding to a first user identified as being absent within the specified area from among the plurality of users.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a block diagram illustrating an example configuration of an electronic device according to various embodiments;

DETAILED DESCRIPTION

The disclosure will be described in greater detail below with reference to accompanying drawings.

Terms used in describing various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in a relevant description. Accordingly, the terms used herein are not to be understood simply as its designation but based on the meaning of the term and the overall context of the disclosure.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

The expression at least one from among A and/or B is to be understood as indicating any one of "A" or "B" or "A and B".

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the disclosure perform at least one function or operation, and may be implemented with a hardware or software, or implemented with a combination of hardware and software. In addition, a plurality of "modules" or a plurality of "parts," except for a "module" or a "part" implemented to a specific hardware, may be integrated in at least one module and implemented with at least one processor (not shown).

In the disclosure, the term "user" may refer to a person using an electronic device or a device (e.g., an artificial intelligence electronic device) using the electronic device.

Various example embodiments of the disclosure will be described in greater detail below with reference to the accompanied drawings.

Figure 1:
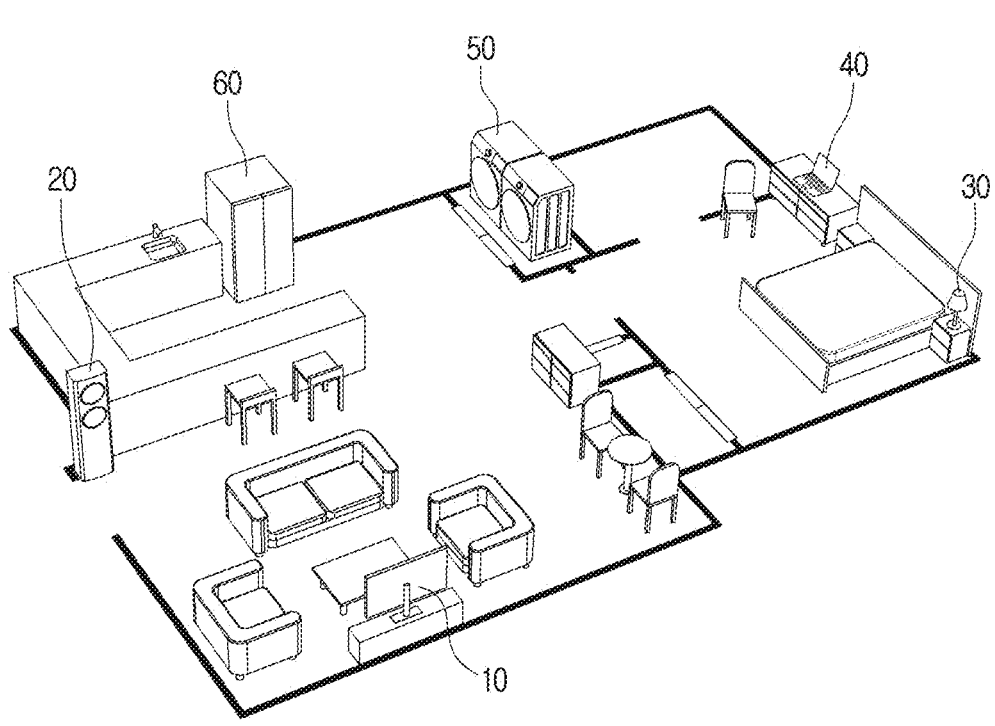
FIG. 1 is a diagram illustrating a plurality of external devices positioned within a home according to various embodiments.

FIG. 1 is a diagram illustrating a plurality of external devices positioned within a home according to various embodiments.

Referring to FIG. 1, a plurality of external devices 10, 20, . . . , 60 may be provided within the home according to electronic devices of various types being developed and supplied.

Specifically, the plurality of external devices 10, 20, 30, 40, 50, 60 (which may be referred to as 10, 20, . . . , 60) may be respectively implemented as an Internet of Things (IoT) device and perform communication with another external device, a user terminal device, a remote control device, a server, and the like provided within the home.

The respective external devices 10, 20, . . . , 60 shown in FIG. 1 are merely examples for convenience of description, and the respective external devices 10, 20, . . . , 60 may be implemented as home appliances of various types, such as, for example, and without limitation, an air conditioner, a kitchen/cooking device, a wired/wireless cleaning device, an image processing device, a clothing management device, or the like.

For example, the respective external devices 10, 20, . . . , 60 may include, for example, and without limitation, at least one from among a television (TV), a user terminal device, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a virtual reality (VR) implementation device, a wearable device, or the like. The wearable device may include, for example, and without limitation, at least one from among an accessory type (e.g., a watch, a ring, a bracelet, an anklet, a necklace, a pair of glasses, a contact lens or a head-mounted-device (HMD)), a fabric or a garment-embedded type (e.g., an electronic clothing), a body-attached type (e.g., a skin pad or a tattoo), a bio-implantable circuit, or the like. In various embodiments, the respective external devices 10, 20, . . . , 60 may include, for example, and without limitation, at least one from among a television, a digital video disk (DVD) player, an audio, a refrigerator, an air conditioner, a cleaner, an oven, a microwave, a washer, an air purifier, a source device (e.g., a set-top box, a cloud server, an over-the-top media service (OTT service) server, etc.), a home automation control panel, a security control panel, a media box (e.g., Samsung HomeSync™, Apple TV™, or Google TV™), a game console (e.g., Xbox™, PlayStation™, Switch™), an electronic dictionary, an electronic key, a camcorder, an electronic frame, or the like.

In an embodiment, the respective external devices 10, 20, . . . , 60 may include, for example, and without limitation, at least one from among various medical devices (e.g., various portable medical measurement devices (a glucose measuring device, a heart rate measuring device, a blood pressure measuring device, a temperature measuring device, etc.), a magnetic resonance angiography (MRA), a magnetic resonance imaging (MRI), a computed tomography (CT), an imaging device, an ultrasonic device, etc.), a navigation device, a global navigation satellite system (GNSS), an event data recorder (EDR), a flight data recorder (FDR), a vehicle infotainment device, a nautical electronic equipment (e.g., a nautical navigation device, a gyro compass, etc.), an avionics electronic device, a security device, a vehicle head unit, an industrial or household robot, a drone, an automated teller machine (ATM) of financial institutions, a point of sales (POS) of shops, an internet of things device (e.g., a light bulb, various sensors, a sprinkler device, a fire alarm, a thermostat, a street light, a toaster, an exercise equipment, a hot water tank, a heater, a boiler, etc.), or the like.

To reduce a total power consumption of a household according to power consumptions of the respective external devices 10, 20, . . . , 60, the respective external devices 10, 20, . . . , 60 may operate in a low-power mode. For example, if the low-power mode is activated according to a user input through the user terminal device, the server may transmit a control command to operate in the low-power mode to the respective external devices 10, 20, . . . 60 provided within the home.

For example, the plurality of external devices 10, 20, . . . , 60 may all be operated in the low-power mode according to the user input, and a first external device 10 from among the plurality of external devices 10, 20, . . . , 60 may be operated in the low-power mode.

In the related art, to operate the respective external devices 10, 20, . . . , 60 in the low-power mode, there has been an inconvenience of a user input for activating the low-power mode being required.

In addition, if the first external device 10 is operated in the low-power mode according to a setting that operates the respective external devices 10, 20, . . . , 60 in the low-power mode at a preset (e.g., specified) time, there has been a problem inconvenience being caused due to the first external device 10 used by a first user who is present in a room within the home operating in the low-power mode regardless of an intent of the first user at the preset time.

To address the above-described problem, an electronic device according to an example of the disclosure may identify a use pattern of a user for the respective external devices 10, 20, . . . , 60, and operate the respective external devices 10, 20, . . . , 60 in the low-power mode according to the use pattern. For example, the electronic device may identify whether the user is absent within a space (e.g., a house) (or, a preset area), and operate the respective external devices 10, 20, . . . , 60 in the low-power mode according to the use pattern of the user at an absence of the user.

The electronic device according to an example may be any one from among the plurality of external devices 10, 20, . . . , 60, and may include a server positioned outside of the space (e.g., the house) and which communicates with the respective external devices 10, 20, . . . , 60.

Figure 2:
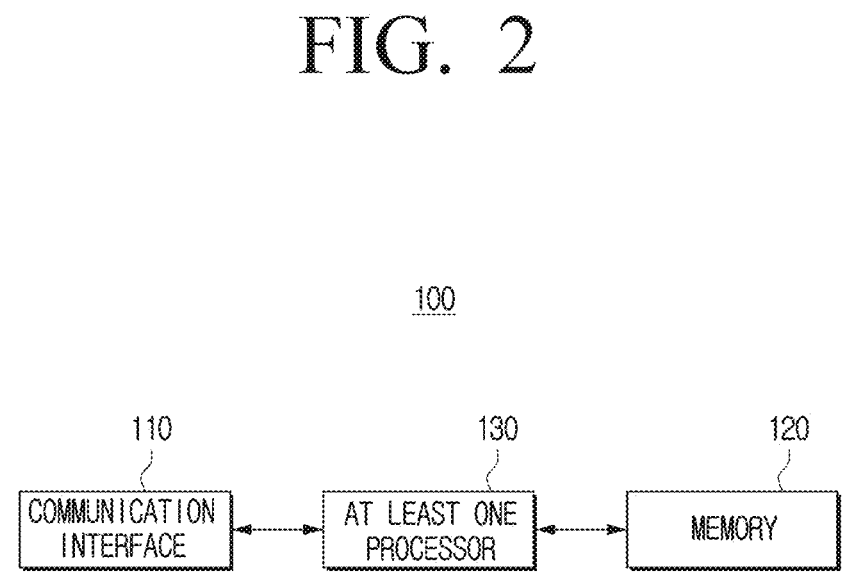

FIG. 2 is a block diagram illustrating an example configuration of an electronic device according to various embodiments.

Referring to FIG. 2, an electronic device 100 may include a communication interface (e.g., including communication circuitry) 110, a memory 120, and at least one processor (e.g., including processing circuitry) 130.

The communication interface 110 according to an example may include various communication circuitry including, for example, a wired or wireless input and output interface (or, an input and output terminal) according to various standards. For example, the communication interface 110 may include various interfaces such as, for example, and without limitation, a high-definition multimedia interface (HDMI), a mobile high-definition link (MHL), a universal serial bus (USB), a display port (DP), Thunderbolt, a video graphics array (VGA) port, an RGB port, a D-subminiature (D-SUB), a digital visual interface (DVI), an AP based Wi-Fi (Wi-Fi, wireless LAN network), Bluetooth, ZigBee, a wired/wireless local area network (LAN), a wide area network (WAN), Ethernet, IEEE 1394, Audio Engineering Society/European Broadcasting Union (AES/EBU), Optical, Coaxial, or the like.

The communication interface 110 according to an example of the disclosure may transmit the control command to operate in the low-power mode to the respective external devices 10, 20, . . . , 60 by control of the at least one processor 130.

The memory 120 according to an example may store data for various embodiments of the disclosure. The memory 120 may be implemented in a form of a memory embedded to the electronic device 100 according to data storage use, or implemented in a form of a memory attachable to or detachable from the electronic device 100.

For example, data for driving of the electronic device 100 may be stored in the memory embedded in the electronic device 100, and data for an expansion function of the electronic device 100 may be stored in the memory attachable to or detachable from the electronic device 100. The memory embedded in the electronic device 100 may be implemented as at least one from among a volatile memory (e.g., a dynamic RAM (DRAM), a static RAM (SRAM), or a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD)). In addition, the memory attachable to or detachable from the electronic device 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The memory 120 according to an example may store at least one instruction or computer programs including instructions for controlling the electronic device 100.

The memory 120 according to an example may store use pattern information corresponding to a plurality of users, respectively.

The memory 120 according to an example may include spatial information (or, area information) corresponding to the space (or, the preset area), and the spatial information may classify a plurality of sub spaces respectively included in the space as a common space or a private space. For example, the spatial information may be a map corresponding to a space within the home, and the respective sub spaces may include one space partitioned by the user, an independent space (e.g., a living room, a kitchen, a dressing room, etc.) surrounded by obstacles (e.g., wall surfaces, thresholds, etc.), and the like. The common space according to an example (e.g., the living room) may be a sub space identified with a relatively large number of users (e.g., three or more persons), and the private space (e.g., the bedroom) may be a sub space identified with a relatively small number of users (e.g., one to two persons). According to an example, the space may be referred to as the preset area, but will be collectively referred to as the space for convenience of description. In addition, the spatial information may be referred to as the area information, but will be collectively referred to as the spatial information for convenience of description.

The at least one processor 130 according to an example may include various processing circuitry and control the overall operation of the electronic device 100.

According to an embodiment, the at least one processor 130 may be implemented as a digital signal processor (DSP) for processing a digital image signal, a microprocessor, or a time controller (TCON). However, the disclosure is not limited thereto, and may include one or more from among a central processing unit (CPU), a micro controller unit (MCU), a micro processing unit (MPU), a controller, an application processor (AP), a communication processor (CP), an ARM processor, an artificial intelligence (AI) processor, or the like, or may be defined by a relevant term. In addition, the at least one processor 130 may be implemented with a System on Chip (SoC) or a large scale integration (LSI) in which a processing algorithm is embedded, and may be implemented in a form of a field programmable gate array (FPGA). The at least one processor 130 may perform various functions by executing computer executable instructions stored in the memory. The at least one processor 130 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The at least one processor 130 according to an example of the disclosure may identify whether the respective users are absent within the space based on a preset condition.

The at least one processor 130 according to an example may control the communication interface 110 to transmit the control command for operating the first external device 10 from among the plurality of external devices 10, 20, . . . , 60 in the low-power mode to the first external device 10 based on first use pattern information corresponding to the first user identified as absent within the space from among the plurality of users.

Figure 3:
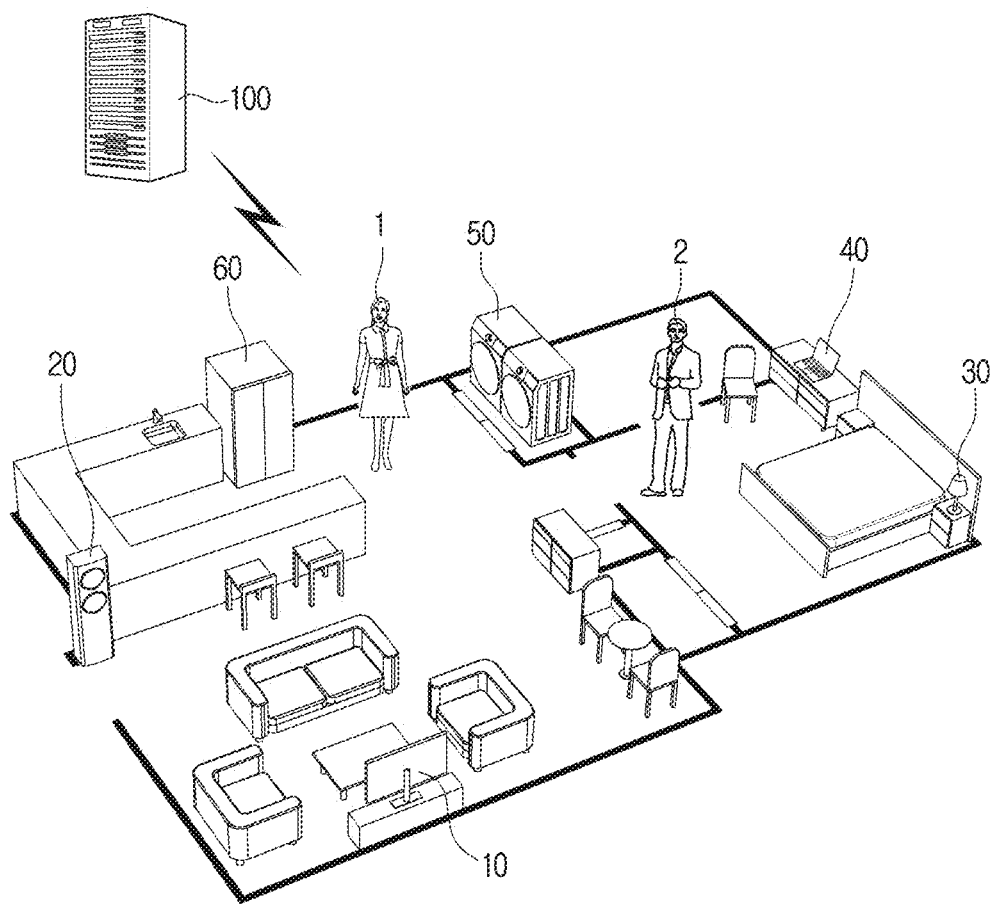
FIG. 3 is a diagram illustrating a plurality of users according to various embodiments.

FIG. 3 is a diagram illustrating a plurality of users according to various embodiments.

Referring to FIG. 3, a first user 1 and a second user 2 may be positioned within the space.

The electronic device 100 according to an example may obtain first use pattern information corresponding to the first user 1 and second use pattern information corresponding to the second user 2 and store in the memory 120.

Figure 4:
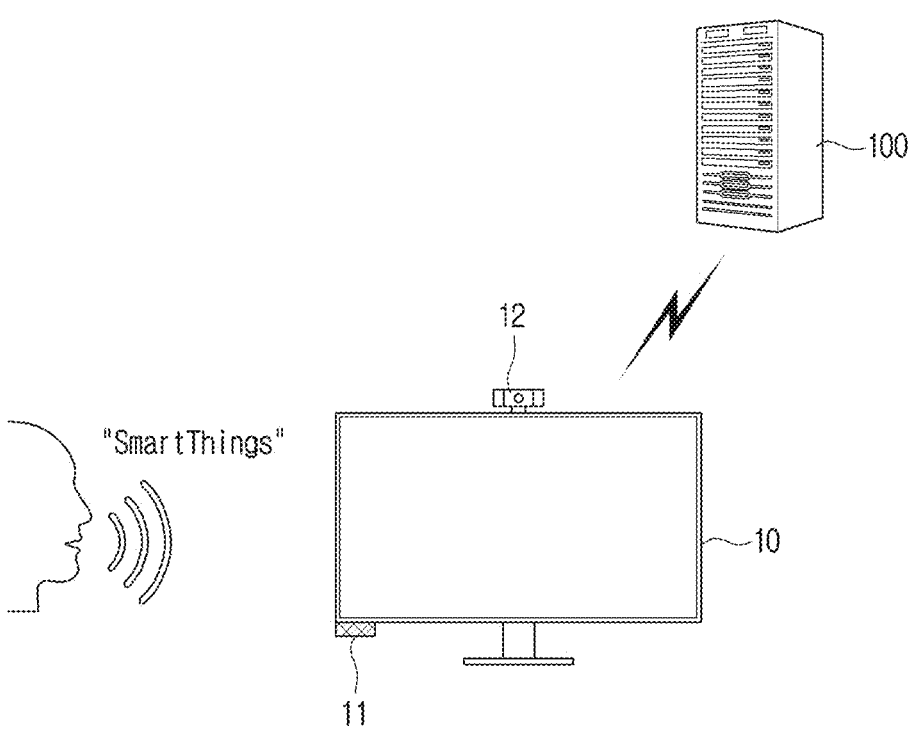
FIG. 4 is a diagram illustrating an external device identifying a user using an external device according to various embodiments.

FIG. 4 is a diagram illustrating an external device identifying a user using an external device according to various embodiments.

In FIG. 4, although the external device that identifies the user has been described as the first external device 10 which is implemented as the TV for convenience of description, various embodiments are not limited thereto. For example, the external device that identifies the user may be a sixth external device 60 which is implemented as a refrigerator.

The first external device 10 may receive a voice input of the first user 1 through a microphone 11 included in the first external device 10. The first external device 10 may perform an operation corresponding to the voice input of the first user 1.

The first external device 10 according to an example may identify a first voice characteristic corresponding to the first user by analyzing the voice input of the first user 1.

The first external device 10 according to an example may receive the voice input of the first user 1 by a threshold number of times or more, and transmit identification information of the first user 1 (e.g., User 1) and identification information of the first external device 10 (e.g., a TV product name) to the electronic device 100 based on the first voice characteristic being identified by the threshold number of times or more.

The at least one processor 130 according to an example may obtain, based on the identification information of the first user 1 and the identification information of the first external device 10 being received, use pattern information of the first user 1. The use pattern information may include time-of-use information (e.g., day of the week, time, etc.), power consumption information, and the like of the first external device 10.

However, the above-described example may be an example for convenience of description, and an operation of the first external device 10 may be performed by the electronic device 100, and an operation of the electronic device 100 may be performed by the first external device 10.

For example, the first external device 10 may transmit the voice input of the first user 1 to the electronic device 100. The at least one processor 130 may receive the voice input of the first user 1 from the first external device 10 by the threshold number of times or more, and obtain the use pattern information corresponding to the first user 1 based on the identification information first user 1 and the identification information of the first external device 10 if the first voice characteristic is identified by the threshold number of times or more.

The first external device 10 according to an example may identify the first user 1 through a camera 12 included in the first external device 10.

The first external device 10 according to an example may transmit, based on a number of times the first user 1 is identified through the camera 12 being the threshold number of times or more, the identification information first user 1 and the identification information of the first external device 10 to the electronic device 100.

The at least one processor 130 according to an example may obtain, based on the identification information first user 1 and the identification information of the first external device 10 being received, the use pattern information corresponding to the first user 1.

However, the above-described example may be an example for convenience of description, and the first external device 10 may transmit a captured image of the first user 1 (e.g., a face ID) to the electronic device 100. The at least one processor 130 may receive the captured image of the first user 1 from the first external device 10 by the threshold number of times or more, and obtain the use pattern information corresponding to the first user 1 based on the identification information first user 1 and the identification information of the first external device 10 if the first user 1 is identified by the threshold number of times or more.

Figure 5:
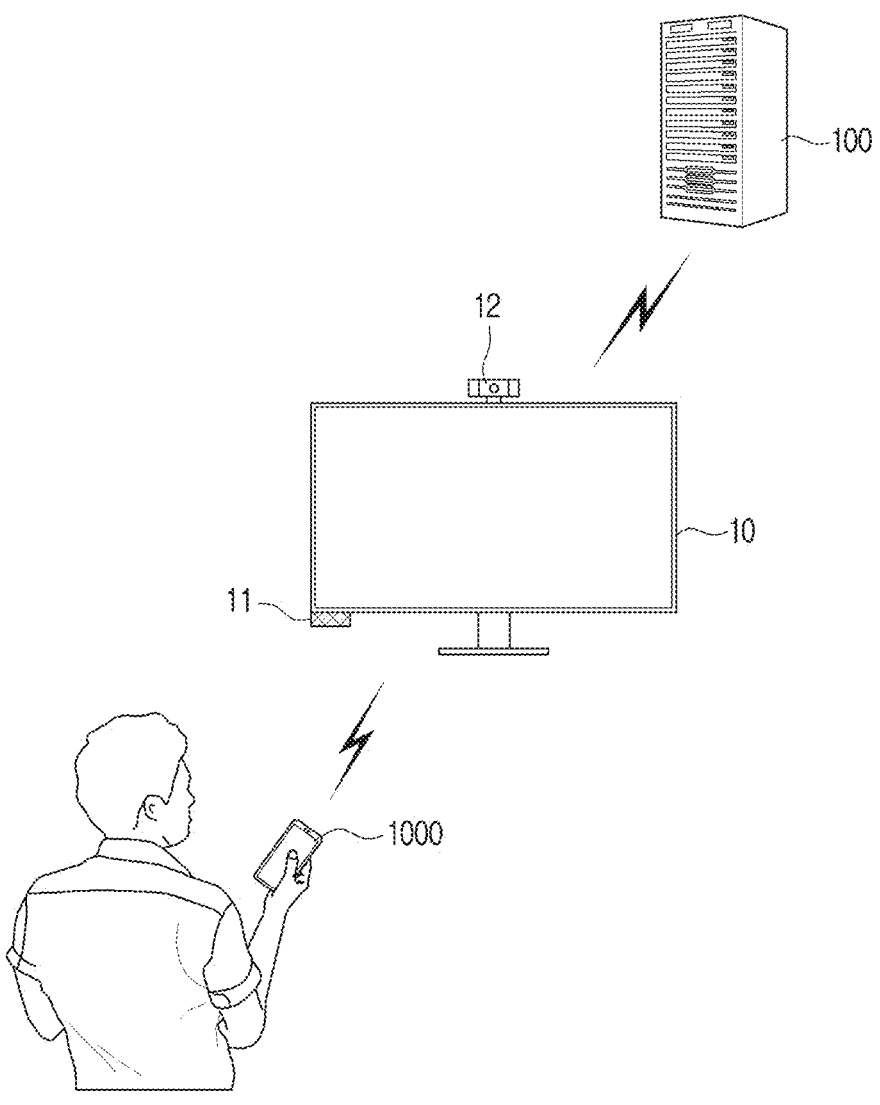
FIG. 5 is a diagram illustrating an external device identifying a user using an external device according to various embodiments.

FIG. 5 is a diagram illustrating an external device identifying a user using an external device according to various embodiments.

Referring to FIG. 5, the first external device 10 may communicate with a first user terminal device 1000 corresponding to the first user 1 through a communication interface included in the first external device 10.

For example, the first user terminal device 1000 may transfer a BLE Advertisement Packet, the communication interface included in the first external device 10 may receive the BLE Advertisement Packet transferred by the first user terminal device 1000 by performing a BLE Scan, and identify the first user terminal device 1000 based on the BLE Advertisement Packet.

For example, the first external device 10 may identify the first user terminal device 1000 by receiving the BLE Advertisement Packet transferred by the first user terminal device 1000 which is positioned 20 to 30 m from the first external device 10.

The first external device 10 according to an example may transmit, based on a number of times communication with the first user terminal device 1000 is carried out through the communication interface being the threshold number of times or more, the identification information first user 1 and the identification information of the first external device 10 to the electronic device 100.

The at least one processor 130 according to an example may obtain, based on the identification information of the first user 1 and the identification information of the first external device 10 being received, the use pattern information corresponding to the first user 1.

Figure 6:
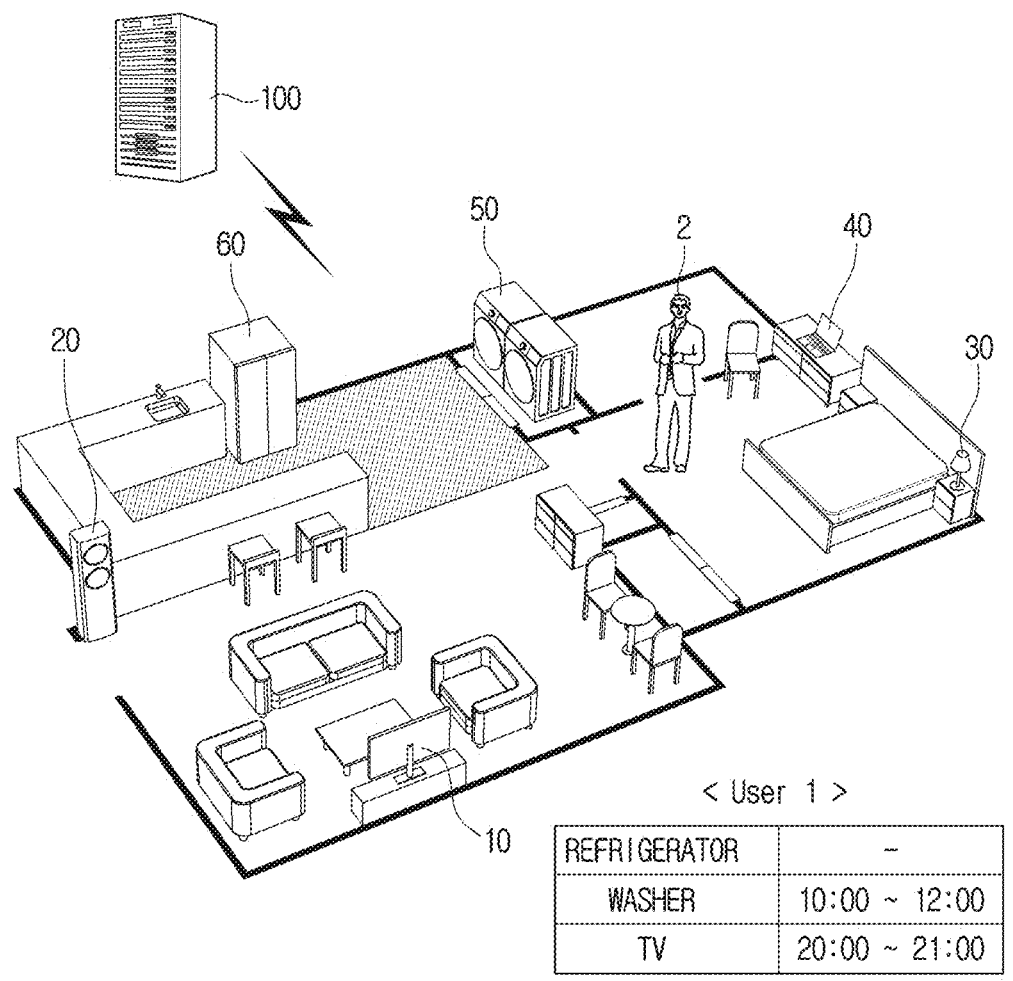
FIG. 6 is a diagram illustrating an absence of a first user and a first use pattern corresponding to the first user according to various embodiments.

FIG. 6 is a diagram illustrating an absence of a first user and a first use pattern corresponding to the first user according to various embodiments.

The at least one processor 130 according to an example may receive identification information of a user (e.g., User 1) and time-of-use information of the user (e.g., time, day of the week, etc.) from the respective external devices 10, 20, . . . , 60 positioned with the home, and obtain the use pattern information corresponding to the user by inputting the identification information and time-of-use information of the user received from the respective external devices 10, 20, . . . , 60 in a neural network model.

For example, the at least one processor 130 may receive at least one from among the voice input of the first user 1, the captured image of the first user 1, or identification information of the first user terminal device 1000 corresponding to the first user 1, and the time-of-use information of the first user 1 for the first external device 10 from the first external device 10.

The at least one processor 130 according to an example may obtain the identification information of the first user 1 by inputting at least one from among the voice input of the first user 1, the captured image of the first user 1, or the identification information of the first user terminal device 1000 corresponding to the first user 1 received from the first external device 10 in the neural network model.

The at least one processor 130 according to an example may receive the time-of-use information for the first external device 10 based on the first user 1 using the first external device 10, and obtain main time-of-use information (e.g., time, day of the week, etc.) for the first external device 10 by inputting the time-of-use information in the neural network model.

The use pattern information output by the neural network model may include an external device mainly (or, frequently) used by the user from among the plurality of external devices 10, 20, . . . , 60 and time information of having mainly used the relevant external device.

Referring to FIG. 6, the at least one processor 130 may transmit, based on an absence of the first user 1 from among the first user 1 and the second user 2 being identified, the control command for operating the first external device 10 included in the first use pattern information corresponding to the first user 1 in the low-power mode to the first external device 10.

For example, the first use pattern information corresponding to the first user 1 may include position information within the space and the time-of-use information of each of the refrigerator (the sixth external device 60), a washer (a fifth external device 50), and the TV (the first external device 10) identified as used by the first user 1.

The at least one processor 130 according to an example of the disclosure may transmit, based on the absence of the first user 1 being identified, a control command for operating each of the first external device 10, the fifth external device 50, and the sixth external device 60 in the low-power mode based on the first use pattern information.

The at least one processor 130 according to an example of the disclosure may compare, even if the absence of the first user 1 is not identified (e.g., if the first user 1 is identified as present in a room within the space), the time-of-use information of the first external device 10 included in the first use pattern information corresponding to the first user 1 and current time information.

The at least one processor 130 according to an example may transmit, based on the time-of-use information of the first external device 10 included in the first use pattern information and the current time information being different, the control command for operating the first external device 10 in the low-power mode. For example, if a main time-of-use for the first external device 10 by the first user 1 is from Monday to Friday between 9:00 and 18:00, the at least one processor 130 may transmit the control command for operating the first external device 10 in the low-power mode at Saturday or Sunday according to the current time information even if the first user 1 is identified as present in a room within the space.

A function associated with artificial intelligence according to the disclosure may be operated through the at least one processor 130 and the memory 120 of the electronic device 100. At this time, the at least one processor 130 may include at least one from among the central processing unit (CPU), a graphics processing unit (GPU), and a neural processing unit (NPU), but is not limited to the example of the above-described processor.

The CPU may include a generic-purpose processor which can perform not only general operations, but also artificial intelligence operations, and may efficiently execute complex programs through a multi-tiered cache structure. The CPU may be advantageous in a series processing method which allows for an organic connection between a previous calculation result and a following calculation result to be possible through a sequential calculation. The generic-purpose processor may not be limited to the above-described examples unless otherwise specified as the above-described CPU.

The GPU may include a processor for mass operations such as a floating point operation used in graphics processing, and perform a large-scale operation by integrating cores in mass in parallel. For example, the GPU may be advantageous in a parallel processing method such as a convolution operation compared to the CPU. In addition, the GPU may be used as a co-processor for supplementing a function of the CPU. The processor for mass operations may not be limited to the above-described examples unless otherwise specified as the above-described GPU.

The NPU may include a processor which specializes in an artificial intelligence operation using an artificial neural network, and may implement each layer that forms the artificial neural network with hardware (e.g., silicon). At this time, because the NPU is designed specialized according to a required specification of a company, there is a lower degree of freedom compared to the CPU or the GPU, but the NPU may efficiently process the artificial intelligence operation demanded by the company. Meanwhile, as a processor specializing in the artificial intelligence operation, the NPU may be implemented in various forms such as, for example, and without limitation, a tensor processing unit (TPU), an intelligence processing unit (IPU), a vision processing unit (VPU), and the like. The artificial intelligence processor may not be limited to the above-described examples unless otherwise specified as the above-described NPU.

In addition, the at least one processor 130 may be implemented as a System on Chip (SoC). The SoC may be further included with the memory 120 in addition to the at least one processor 130, and a network interface such as a Bus for data communication between the at least one processor 130 and the memory 120.

If a plurality of processors is included in the System on Chip (SoC) included in the electronic device 100, the electronic device 100 may perform an operation associated with artificial intelligence (e.g., an operation associated with learning or inference of an artificial intelligence model) using a portion of the processors from among the plurality of processors. For example, the electronic device 100 may perform an operation associated with artificial intelligence using at least one from among the GPU, the NPU, the VPU, the TPU, and a hardware accelerator specializing in artificial intelligence operations such as the convolution operation, and a matrix multiplication operation from among the plurality of processors. However, the above is merely an embodiment, and operations associated with artificial intelligence may be processed using the generic-purpose processor such as the CPU.

In addition, the electronic device 100 may perform an operation for a function associated with artificial intelligence using multicores (e.g., a dual core, a quad core, etc.) included in the at least one processor 130. Specifically, the electronic device 100 may perform artificial intelligence operations such as the convolution operation, and the matrix multiplication operation in parallel using the multicores included in the at least one processor 130.

The at least one processor 130 may process input data according to a pre-defined operation rule or an artificial intelligence model stored in the memory 120. The defined operation rule or the artificial intelligence model is characterized by being created through learning.

The being created through learning may refer, for example, to a pre-defined operation rule or an artificial intelligence model of a desired characteristic being created by applying a learning algorithm to a plurality of learning data. The learning may be carried out in a device itself in which the artificial intelligence according to the disclosure is performed, or carried out through a separate server and/or system.

The artificial intelligence model may be formed of a plurality of neural network layers. At least one layer may have at least one weight value, and perform a layer operation through an operation result of a previous layer and at least one defined operation. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, and a Transformer, and the neural network in the disclosure may not be limited to the above-described examples unless otherwise specified.

The learning algorithm may include a method for training a predetermined target device (e.g., a robot) to make decisions or predictions by the predetermined device itself using the plurality of learning data. Examples of the learning algorithm may include a supervised learning, an unsupervised learning, a semi-supervised learning, or a reinforcement learning, and the learning algorithm of the disclosure is not limited to the above-described examples unless otherwise specified.

<Use Pattern Information Including Power Consumption Information>

In addition, the use pattern information corresponding to a user may include an average power consumption information of an external device according to user of the external device by the user.

For example, the electronic device 100 may receive, based on the first user 1 using the first external device 10, power consumption information of the first external device 10 according to use of the first external device 10, and the at least one processor 130 may obtain an average power consumption information of the first external device 10 based on the power consumption information.

The use pattern information corresponding to a user may identify, based on average power consumption information of an external device, whether the external device is a device required to convert to the low-power mode when executing a power consumption decreasing mode.

For example, the at least one processor 130 may identify, based on an average power consumption being greater than or equal to a threshold value or more based on the average power consumption information of the first external device 10, the first external device 10 as the device required to convert to the low-power mode for a decrease in power consumption within the home because power consumption is relatively high. Hereinafter, the device required to convert to the low-power mode may be collectively referred to as a device subject to a low-power mode.

The at least one processor 130 according to an example may transmit, based on the absence of the first user 1 being identified, the control command to operate the first external device 10, which is the device subject to the low-power mode, in the low-power mode based on the first use pattern information corresponding to the first user 1.

Figure 7:
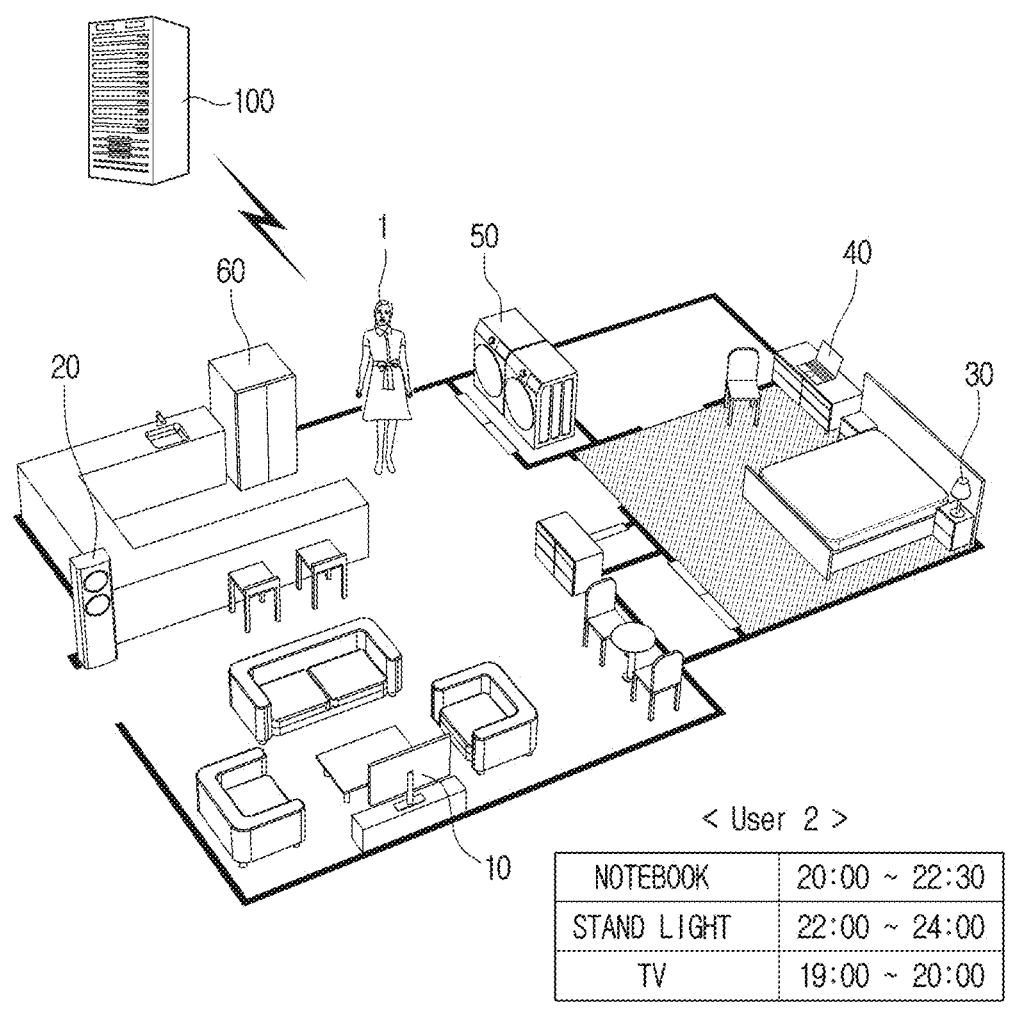
FIG. 7 is a diagram illustrating an absence of a second user and a second use pattern corresponding to the second user according to various embodiments.

FIG. 7 is a diagram illustrating an absence of a second user and a second use pattern corresponding to the second user according to various embodiments.

The power consumption decreasing mode according to an example of the disclosure may be a mode for operating at least one from among the plurality of external devices 10, 20, . . . , 60 in the low-power mode in order to decrease the total power consumption of the household according to the power consumption of the respective external devices 10, 20, . . . , 60.

According to an example, the at least one processor 130 may execute, based on a user input executing the power consumption decreasing mode being received or the preset time arriving, the power consumption decreasing mode by identifying as the preset condition being satisfied, or a trigger as having occurred. The at least one processor 130 according to an example may identify, based on a function corresponding to the decrease in power consumption being executed, whether the respective users are absent within the space.

Referring to FIG. 7, the at least one processor 130 may transmit, based on an absence of the second user 2 being identified, a control command for operating each of a notebook (a fourth external device 40), a lighting (the fifth external device 50), and the TV (the first external device 10) in the low-power mode based on the second use pattern information corresponding to the second user 2.

As described above, even if the second user 2 is identified as present in a room within the space, the time-of-use information of each of the first external device 10, the fourth external device 40, and the fifth external device 50 included in the second use pattern information and the current time information may be compared, and the control command for operating at least one from among the first external device 10, the fourth external device 40, and the fifth external device 50 in the low-power mode may be transmitted according to the comparison result.

For example, if the current time is 23:00, because the time-of-use information of each of the notebook (the fourth external device 40) and the TV (the first external device 10) excluding the lighting (the fifth external device 50) are different from the current time information, the notebook and the TV may be operated in the low-power mode.

According to an example, the at least one processor 130 may not operate the external device in the low-power mode if the external device included in the use pattern information corresponding to the user identified as absent is also included in the use pattern information corresponding to the user identified as present in a room within the space.

For example, the at least one processor 130 may operate the first external device 10 in the low-power mode based on the use pattern information corresponding to the second user 2 identified as absent. However, the at least one processor 130 may not transmit the control command to operate in the low-power mode to the first external device 10 if the use pattern information corresponding to the first user 1 identified as present in a room includes the identification information of the first external device 10.

<Spatial Information>

The memory 120 in an example of the disclosure may include spatial information corresponding to the space, and the spatial information may classify the respective sub spaces included in the space into a common space or a private space. For example, the spatial information may be a map corresponding to a space within the home, and the respective sub spaces may include one space partitioned by the user, an independent space (e.g., a living room, a kitchen, a dressing room, etc.) surrounded by obstacles (e.g., wall surfaces, thresholds, etc.), and the like. The common space according to an example (e.g., the living room) may be a sub space identified with a relatively large number of users (e.g., three or more persons), and the private space (e.g., the bedroom) may be a sub space identified with a relatively small number of users (e.g., one to two persons).

In an example, the at least one processor 130 may convert only the external device positioned in the private space in the low-power mode from among the external devices included in the use pattern information corresponding to the user identified as absent.

For example, the at least one processor 130 may convert the fourth external device 40 and the fifth external device 50 positioned in the private space in the low-power mode, and not convert the first external device 40 in the low-power mode based on position information of each of the notebook (the fourth external device 40), the lighting (the fifth external device 50), and the TV (the first external device 10) corresponding to the second user 2 identified as absent.

Figure 8:
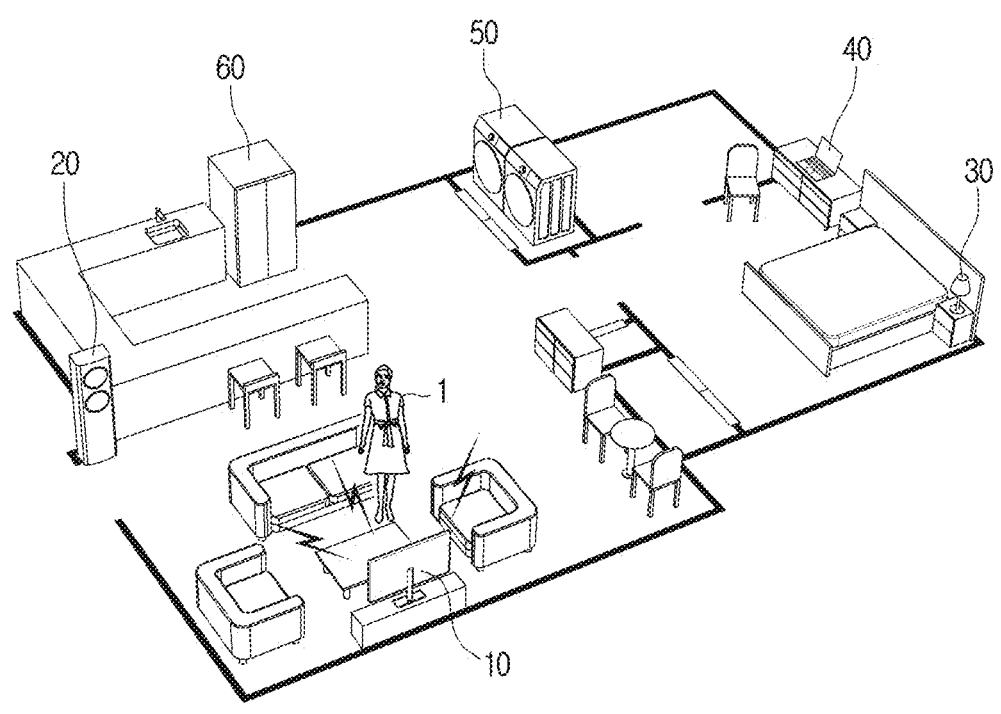
FIG. 8 is a diagram illustrating an example operation of any one external device from among a plurality of external devices positioned within a home according to various embodiments.

FIG. 8 is a diagram illustrating an example operation of any one external device from among a plurality of external devices positioned within a home according to various embodiments.

In the above-described example, the electronic device 100 has been described as the server which is not positioned within the home for convenience of description, but is not limited thereto. For example, as shown in FIG. 8, any one from among the plurality of external devices 10, 20, . . . , 60 may perform an operation of the electronic device 100 according to the above-described embodiment.

For example, the first external device 10 from among the plurality of external devices 10, 20, . . . , 60 may transmit the control command to operate in the low-power mode to each of the remaining external devices 20, . . . , 60, and obtain the use pattern information corresponding to a user by receiving the identification information of the user and the time-of-use information from each of the remaining external devices 20, . . . , 60. For example, the first external device 10 may operate with a Hub device within the household capable of communicating with each of the remaining external devices 20, . . . , 60.

<Obtaining Mode Information>

The at least one processor 130 according to an embodiment of the disclosure may receive mode information of the respective external devices 10, 20, . . . , 60.

For example, the at least one processor 130 may transmit the control command for operating the first external device 10 in the low-power mode based on the first use pattern information corresponding to the first user 1 identified as absent, and may not transmit the control command if the first external device 10 is already operating in the low-power mode based on mode information of the first external device 10.

For example, the at least one processor 130 may operate the first external device 10 in a normal mode if a timer setting associated with an operation of the first external device 10 is identified in the first external device based on the mode information. For example, the at least one processor 130 may convert the washer (the fifth external device 50) in the low-power mode when the first user 1 is absent, but if the timer setting associated with an operation is identified according to mode information of the fifth external device 50, the washer may not be converted to the low-power mode according to a user intent of operating in the normal mode for a time corresponding to the timer setting.

The normal mode may be the remaining mode excluding the low-power mode (or, a standby mode, or an off mode) for convenience of description, and may include modes and the like corresponding to a user operation.

Figure 9:
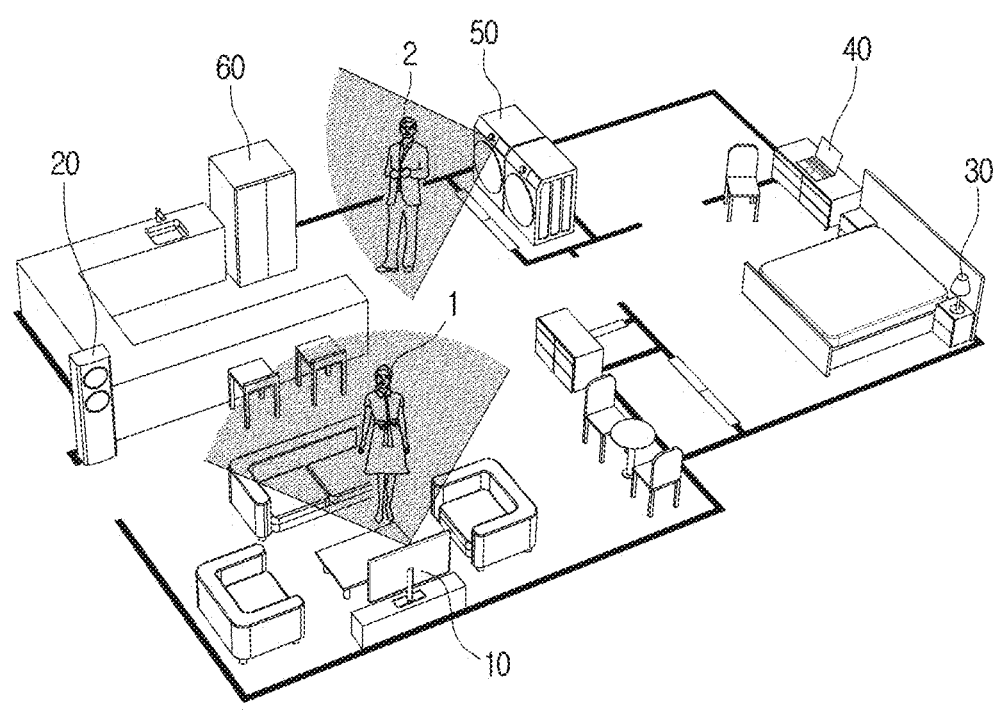
FIG. 9 is a diagram illustrating an external device identifying whether a user is absent according to various embodiments.

FIG. 9 is a diagram illustrating an external device identifying whether a user is absent according to various embodiments.

The respective external devices 10, 20, . . . , 60 according to an example of the disclosure may identify a user through at least one sensor included in the respective external devices 10, 20, . . . , 60.

For example, the first external device 10 may sense a user through at least one from among the microphone 11, the camera 12, or the communication interface included in the first external device 10 regardless of whether the first external device 10 is used.

The electronic device 100 according to an example of the disclosure may identify that the first user 1 is present in a room based on the first user 1 being sensed from any one from among the plurality of external devices 10, 20, . . . , 60, and that the first user 1 is absent based on the first user 1 not being sensed from any one from among the plurality of external devices 10, 20, . . . , 60.

For example, the at least one processor 130 may identify that a user is absent if a user terminal device corresponding to a user is not connected to an access point (AP) within the household.

The at least one processor 130 according to an example may identify that a user is present in a room if the user terminal device corresponding to a user is connected to the AP. According to an example, the at least one processor 130 may identify that a user is absent if the user terminal device is connected to the AP within the household, but the user terminal device is not in motion for a threshold time or more, because the user may have gone out without carrying the user terminal device.

Figure 10:
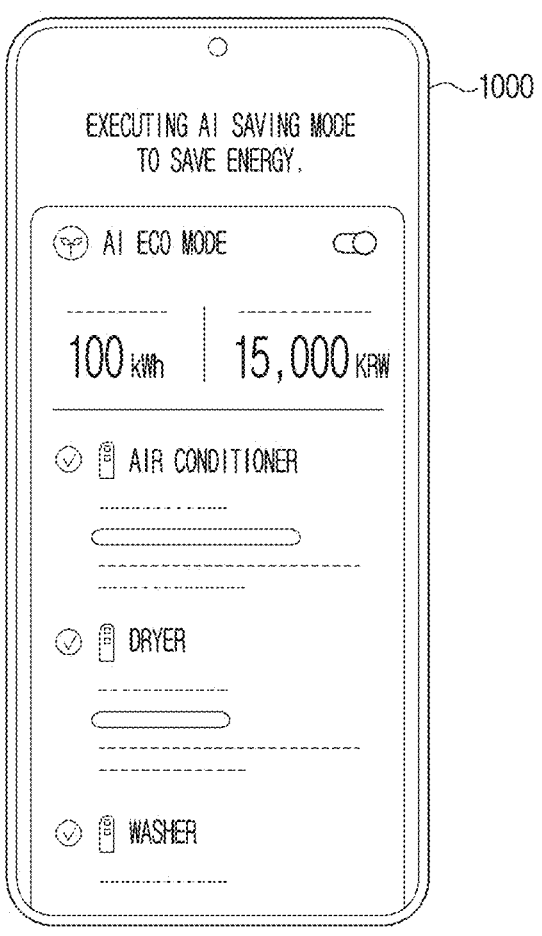
FIG. 10 is a diagram illustrating a preset condition according to various embodiments.

FIG. 10 is a diagram illustrating an example preset condition according to various embodiments.

The user terminal device 1000 according to an example of the disclosure may provide a user UI for executing a power consumption decreasing mode within the space.

For example, based on the user input of executing the power consumption decreasing mode within the space, the electronic device 100 may identify whether respective users are absent within the space.

The user UI according to an example may include a user interface (UI) for operating at least one from among the plurality of external devices 10, 20, . . . , 60 in the low-power mode, and display state information of the respective external devices 10, 20, . . . , 60.

The user UI according to an example may provide operations which are limited when the respective external devices 10, 20, . . . , 60 are operated in the low-power mode (e.g., an unusable function (disable)), an estimated power consumption, and the like.

The user UI according to an example may provide total power consumption within a current household, power consumption estimated to decrease when the external device corresponding to the user identified as absent is converted to the low-power mode, and the like.

Figure 11:
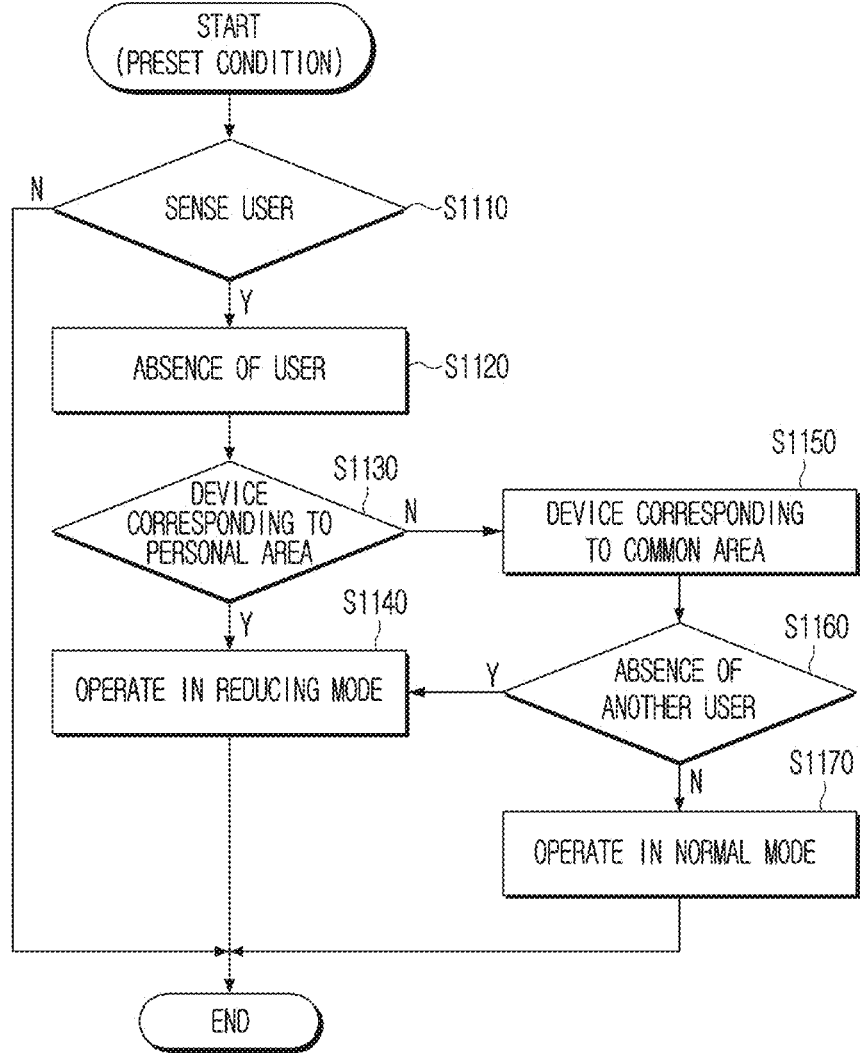
FIG. 11 is a flowchart illustrating an example method of controlling an electronic device according to various embodiments.

FIG. 11 is a flowchart illustrating an example method of controlling an electronic device according to various embodiments.

Referring to FIG. 11, a control method of the electronic device may include, based on the preset condition (or, the trigger), sensing a user within the preset area (S1110).

Then, based on an absence of a user being sensed (S1120), identifying whether the external device corresponding to a user is positioned in the private (e.g., personal) area (S1130).

Based on the external device corresponding to a user being positioned in the private area (S1130: Y), transmitting a control command for the external device to operate in a reducing mode (or, the low-power mode) (S1140).

According to an example, based on the external device corresponding to a user not being positioned in the private area (S1130: N), and being positioned in the common area (S1150), identifying whether another use is absent in the common area (S1160).

According to an example, based on another user also being identified as absent in the common area at which the external device is positioned (S1160: Y), transmitting a control command for the external device to operate in the reducing mode (or, the low-power mode) (S1140). Based on another user being identified as present in a room in the common area at which the external device is positioned (S1160: N), controlling the external device to operate in the normal mode (S1170).

The control method of the electronic device according to an embodiment of the disclosure may include identifying whether the respective users are absent within the preset area based on the preset condition and transmitting a control command for controlling the first external device from among the plurality of external devices to operate in the low-power mode to the first external device based on the first use pattern information corresponding to the first user identified as absent within the preset area from among the plurality of users.

The control method according to an example may further include controlling the second external device from among the plurality of external devices in the normal mode based on the second use pattern information corresponding to the second user identified as present in a room within the preset area from among the plurality of users.

The first use pattern information according to an example may include at least one from among the identification information of the first external device corresponding to the first user, position information of the first external device, or the time-of-use information of the first external device from among the plurality of external devices, and the second use pattern information may include at least one from among identification information of the second external device corresponding to the second user, position information of the second external device, or time-of-use information of the second external device from among the plurality of external devices.

The control method according to an example of the disclosure may further include transmitting, based on the time-of-use information of the second external device included in the second use pattern information and the current time information being different, a control command for controlling the second external device to operate in the low-power mode to the second external device.

The transmitting according to an example of the disclosure may include controlling, based on the second use pattern information including the identification information of the first external device, the first external device to operate in the normal mode.

The transmitting according to an example of the disclosure may include controlling, based on the timer setting associated with an operation of the first external device being identified in the first external device, the first external device to operate in the normal mode.

The electronic device according to an example of the disclosure may include area information corresponding to the preset area, and the area information may classify the plurality of sub areas respectively included in the preset area into the common area or the private area, and the transmitting may include controlling, based on the position information of the first external device included in the first use pattern information, the first external device to operate in the normal mode if the first external device is positioned within the common area and controlling the first external device to operate in the low-power mode if the first external device is positioned within the private area.

The transmitting according to an example of the disclosure may include identifying whether the first external device is the device subject to the low-power mode based on the identification information of the first external device included in the first use pattern information and controlling, based on the first external device being identified as the device subject to the low-power mode, the first external device to operate in the low-power mode.

The first external device according to an example of the disclosure may identify the first user using the first external device through the camera included in the first external device, and the control method may include obtaining, based on the number of times the first user is identified through the camera being the threshold number of times or more, the first use pattern information which includes the identification information of the first external device.

The first external device according to an example of the disclosure may receive the voice input of the first user using the first external device through the microphone included in the first external device, and the control method may include obtaining, based on the number of times the voice input of the first user is received through the microphone being the threshold number of times or more, the first use pattern information including the identification information of the first external device.

The first external device according to an example of the disclosure may communicate with the first user terminal device corresponding to the first user through the communication interface included in the first external device, and the control method may include obtaining, based on the number of times communicating with the first user terminal device through the communication interface being the threshold number of times or more, the first use pattern information including the identification information of the first external device.

The preset condition according to an example of the disclosure may include at least one from among the preset time or the user input executing the power consumption decreasing mode within the preset area, and the identifying whether the respective users are absent may include identifying whether the respective users are absent using the sensor included in the at least one external device from among the plurality of external devices.

However, the various embodiments of the disclosure may be applied to not only the electronic device, but also to electronic devices of various types capable of communicating with the external device.

Various embodiments described above may be implemented in a recordable medium which is readable by a computer or a device similar to the computer using software, hardware, or a combination of software and hardware. In some cases, the various embodiments described herein may be implemented by the processor itself. According to a software implementation, embodiments such as the procedures and functions described herein may be implemented with separate software modules. The respective software modules may perform at least one functions and operation described herein.

Computer instructions for performing processing operations of the display device 100 according to the various embodiments described above may be stored in a non-transitory computer-readable medium. The computer instructions stored in this non-transitory computer-readable medium may cause a specific device to perform a processing operation in the display device 100 according to the above-described various embodiments when executed by a processor of the specific device.

The non-transitory computer-readable medium may refer to a medium that stores data semi-permanently, and is readable by a device. Examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments, it will be understood that the various example embodiments are intended to be illustrative, not limiting. It will be understood by those skilled in the art that various changes in form and detail may be made therein without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a communication interface comprising communication circuitry;
a memory storing use pattern information corresponding to a plurality of users, respectively; and
at least one processor, comprising processing circuitry,
wherein at least one processor, individually and/or collectively, is configured to
identify whether the respective users are absent within a specified area based on a specified condition, and
control the communication interface to transmit a control command operating a first external device from among a plurality of external devices in a low-power mode to the first external device based on first use pattern information corresponding to a first user identified as absent within the specified area from among the plurality of users.

2. The electronic device of claim 1, wherein
at least one processor, individually and/or collectively, is configured to
control a second external device to operate in a normal mode from among the plurality of external devices based on second use pattern information corresponding to a second user identified as present in a room within the specified area from among the plurality of users.

3. The electronic device of claim 2, wherein
the first use pattern information comprises:
at least one from among identification information of the first external device corresponding to the first user, position information of the first external device, or time-of-use information of the first external device from among the plurality of external devices, and
the second use pattern information comprises:
at least one from among identification information of the second external device corresponding to the second user, position information of the second external device, or time-of-use information of the second external device from among the plurality of external devices.

4. The electronic device of claim 3, wherein
at least one processor, individually and/or collectively, is configured to:
control, based on the time-of-use information of the second external device included in the second use pattern information and current time information being different, the second external device to operate in the low-power mode.

5. The electronic device of claim 2, wherein
at least one processor, individually and/or collectively, is configured to:
control, based on the second use pattern information including the identification information of the first external device, the first external device to operate in the normal mode.

6. The electronic device of claim 1, wherein
at least one processor, individually and/or collectively, is configured to:
control, based on a timer setting associated with an operation of the first external device being identified in the first external device, the first external device to operate in the normal mode.

7. The electronic device of claim 1, wherein
the memory comprises:
area information corresponding to the specified area, wherein the area information classifies a plurality of sub areas respectively included in the specified area into a common area or a private area, and at least one processor, individually and/or collectively, is
configured to:
control, based on position information of the first external
device included in the first use pattern information, the
first external device to operate in a normal mode based
on the first external device being positioned within the
common area, and control the first external device to
operate in the low-power mode based on the first
external device being positioned within the private
area.

8. The electronic device of claim 1, wherein
at least one processor, individually and/or collectively, is
configured to:
identify whether the first external device is a device
subject to the low-power mode based on identification
information of the first external device included in the
first use pattern information, and
control, based on the first external device being identified
as the device subject to the low-power mode, the first
external device to operate in the low-power mode.

9. The electronic device of claim 1, wherein
the first external device is configured to:
identify the first user using the first external device
through a camera included in the first external device,
and
at least one processor, individually and/or collectively, is
configured to:
obtain, based on a number of times the first user is
identified through the camera being a threshold number
of times or more, the first use pattern information
comprising identification information of the first exter-
nal device and store the first use pattern information in
the memory.

10. The electronic device of claim 1, wherein
the first external device is configured to:
receive a voice input of the first user using the first
external device through a microphone included in the
first external device, and
at least one processor, individually and/or collectively, is
configured to:
obtain, based on a number of times the voice input of the
first user is received through the microphone being a
threshold number of times or more, the first use pattern
information including identification information of the
first external device and store the first use pattern
information in the memory.

11. The electronic device of claim 1, wherein
the first external device is configured to:
control to communicate with a first user terminal device
corresponding to the first user through a communica-
tion interface included in the first external device, and
at least one processor, individually and/or collectively, is
configured to:
obtain, based on a number of times communicating with
the first user terminal device through the communica-
tion interface being a threshold number of times or
more, the first use pattern information including iden-
tification information of the first external device and
stored in the memory.

12. The electronic device of claim 1, wherein
the specified condition comprises:
at least one from among a specified time or a user input
for executing a function corresponding to a decrease in
power consumption within the specified area, and at least one processor, individually and/or collectively, is
configured to:
identify whether the respective users are absent using a
sensor included in at least one external device from
among the plurality of external devices.

13. A method of controlling an electronic device, the
method comprising:
identifying whether a plurality of users are respectively
absent within a specified area based on a specified
condition; and
transmitting a control command operating a first external
device from among a plurality of external devices in a
low-power mode to the first external device based on
first use pattern information corresponding to a first
user identified as absent within the specified area from
among the plurality of users.

14. The method of claim 13, further comprising:
controlling a second external device from among the
plurality of external devices to operate in a normal
mode based on second use pattern information corre-
sponding to a second user identified as present in a
room within the specified area from among the plurality
of users.

15. The method of claim 14, wherein
the first use pattern information comprises:
at least one from among identification information of the
first external device corresponding to the first user,
position information of the first external device, or
time-of-use information of the first external device
from among the plurality of external devices, and
the second use pattern information comprises:
at least one from among identification information of the
second external device corresponding to the second
user, position information of the second external
device, or time-of-use information of the second exter-
nal device from among the plurality of external
devices.

16. The method of claim 15, further comprising:
controlling, based on the time-of-use information of the
second external device included in the second use
pattern information and current time information being
different, the second external device to operate in the
low-power mode.

17. The method of claim 14, wherein the transmitting
comprises:
controlling, based on the second use pattern information
including the identification information of the first
external device, the first external device to operate in
the normal mode.

18. The method of claim 13, wherein the transmitting
comprises:
controlling, based on a timer setting associated with an
operation of the first external device being identified in
the first external device, the first external device to
operate in the normal mode.

19. The method of claim 13, wherein the electronic device
comprises area information corresponding to the specified
area, wherein the area information classifies a plurality of
sub areas respectively included in the specified area into a
common area or a private area, and
wherein the transmitting comprises:
controlling, based on position information of the first
external device included in the first use pattern infor-
mation, the first external device to operate in a normal
mode based on the first external device being posi-
tioned within the common area, and
controlling the first external device to operate in the
low-power mode based on the first external device
being positioned within the private area.

20. A non-transitory computer-readable recording medium having recorded thereon a program which when executed by at least one processor of an electronic device, causes the electronic device to perform a method of controlling the electronic device, the method comprising:

identifying whether a plurality of users are respectively absent within a specified area based on a specified condition, and transmitting a control command operating a first external device from among a plurality of external devices in a low-power mode to the first external device based on first use pattern information corresponding to a first user identified as being absent within the specified area from among the plurality of users.

\* \* \* \* \*